US011982113B2

(12) United States Patent
Napier et al.

(10) Patent No.: US 11,982,113 B2
(45) Date of Patent: May 14, 2024

(54) MAGNETIC DOOR CLOSURE

(71) Applicant: Cortex, LLC, Knoxville, TN (US)

(72) Inventors: Rodney Napier, Knoxville, TN (US); Zachary P. Beard, Jefferson City, TN (US)

(73) Assignee: Cortex, LLC, Knoxville, TN (US)

( * ) Notice: Subject to any disclaimer, the term of this patent is extended or adjusted under 35 U.S.C. 154(b) by 0 days.

(21) Appl. No.: 18/457,396

(22) Filed: Aug. 29, 2023

(65) Prior Publication Data

US 2024/0068283 A1 Feb. 29, 2024

Related U.S. Application Data

(60) Provisional application No. 63/402,084, filed on Aug. 30, 2022.

(51) Int. Cl.
*E05C 19/16* (2006.01)
*E05C 17/56* (2006.01)

(52) U.S. Cl.
CPC .................................... *E05C 19/16* (2013.01)

(58) Field of Classification Search
CPC ............................... Y10T 292/11; E05C 19/16
See application file for complete search history.

(56) References Cited

U.S. PATENT DOCUMENTS 2,277,057 A 3/1942 Bach
2,472,397 A 6/1949 Bennett
2,496,691 A 2/1950 Berry
2,602,182 A 7/1952 Johnson
2,638,620 A 5/1953 Civitelli
2,813,293 A 11/1957 Civitelli
2,813,294 A 11/1957 Civitelli
2,815,236 A 12/1957 Lowinski
(Continued)

FOREIGN PATENT DOCUMENTS

CA 2957945 A1 8/2018
CN 201159001 Y1 12/2008
(Continued)

OTHER PUBLICATIONS

U.S. Appl. No. 18/456,565, filed Aug. 28, 2023, Rodney Napier.
(Continued)

*Primary Examiner* — Carlos Lugo
(74) *Attorney, Agent, or Firm* — Luedeka Neely, P.C.

(57) ABSTRACT

A magnetic door closure apparatus includes a first magnet in a door frame and second and third magnets in a door. The second and third magnets align with the first magnet when the door is closed. The second magnet's polarity is the same as the first magnet, and the third magnet's polarity is opposite that of the first magnet. When the door is nearly closed, the distance between the first and second magnets is less than the distance between the first and third magnets. The magnetic attraction between the first and third magnets is large enough to overcome the magnetic repulsion between the first and second magnets so that the door can be closed and is large enough to hold the door closed, whereas the magnetic repulsion is large enough to prevent the door from slamming against the door frame as the door is closed.

7 Claims, 4 Drawing Sheets

(56) References Cited

U.S. PATENT DOCUMENTS

| | | | | | |
|---|---|---|---|---|---|
| 2,906,553 | A | * | 9/1959 | Wilson | E05C 19/16 292/251.5 |
| 3,016,563 | A | * | 1/1962 | Edward | E05D 5/065 16/320 |
| 3,135,012 | A | | 6/1964 | Wessel | |
| 3,157,906 | A | | 11/1964 | Wolf | |
| 3,163,453 | A | | 12/1964 | Stephens | |
| 3,174,179 | A | | 3/1965 | Benson | |
| 3,187,372 | A | | 6/1965 | Parsons | |
| 3,261,631 | A | | 7/1966 | Alessi | |
| 3,273,926 | A | | 9/1966 | Pietsch | |
| 3,288,511 | A | | 11/1966 | Tavano | |
| 3,331,043 | A | | 7/1967 | Orzabal | |
| 3,539,214 | A | | 11/1970 | Raymond | |
| 3,562,850 | A | * | 2/1971 | Eliason | E05C 17/56 16/320 |
| 3,636,727 | A | * | 1/1972 | Naughton | F25D 23/028 62/409 |
| 3,913,171 | A | | 10/1975 | Reid | |
| 3,919,743 | A | | 11/1975 | Cutler | |
| 3,971,100 | A | | 7/1976 | Anop | |
| 3,971,581 | A | | 7/1976 | Montgomery | |
| 4,058,335 | A | | 11/1977 | Abe | |
| 4,099,755 | A | | 7/1978 | Anderson | |
| 4,212,392 | A | * | 7/1980 | McKenzie | A45C 13/02 206/592 |
| 4,259,762 | A | | 4/1981 | Civitelli | |
| 4,505,502 | A | | 3/1985 | Tomita | |
| 4,527,303 | A | | 7/1985 | Civitelli | |
| 4,669,766 | A | | 6/1987 | Hanchett, Jr. et al. | |
| 4,754,532 | A | | 7/1988 | Thomson et al. | |
| 4,858,273 | A | | 8/1989 | Civitelli | |
| 4,995,655 | A | | 2/1991 | Freeman | |
| 4,998,941 | A | | 3/1991 | Jack | |
| 5,010,622 | A | | 4/1991 | Morita | |
| 5,077,950 | A | | 1/1992 | Bretches et al. | |
| 5,237,724 | A | | 8/1993 | Lee | |
| 5,376,910 | A | | 12/1994 | Geringer et al. | |
| 5,473,841 | A | | 12/1995 | Grillo | |
| 5,581,844 | A | | 12/1996 | Raheb et al. | |
| 5,727,289 | A | | 3/1998 | Reder | |
| 5,887,917 | A | | 3/1999 | Luciana | |
| 6,163,453 | A | | 12/2000 | Hou et al. | |
| 6,182,336 | B1 | | 2/2001 | Bauer | |
| 6,226,842 | B1 | | 5/2001 | Wong | |
| 7,567,159 | B2 | | 7/2009 | Macken | |
| 7,637,543 | B2 | | 12/2009 | Ferguson | |
| 7,775,567 | B2 | * | 8/2010 | Ligtenberg | E05C 19/16 292/DIG. 37 |
| 8,016,330 | B2 | * | 9/2011 | Fullerton | H01F 13/003 335/306 |
| 8,225,562 | B2 | | 7/2012 | Parker | |
| 8,434,201 | B2 | * | 5/2013 | Wang | A44C 5/2076 24/537 |
| 8,540,292 | B2 | | 9/2013 | Ferguson | |
| 8,801,054 | B2 | * | 8/2014 | Ligtenberg | H05K 5/0221 292/177 |
| 8,864,188 | B2 | | 10/2014 | Redgrave | |
| 8,955,891 | B2 | | 2/2015 | Millsap | |
| 9,033,377 | B2 | | 5/2015 | Day et al. | |
| 9,297,189 | B2 | * | 3/2016 | Ho | E05C 19/16 |
| 9,689,527 | B2 | | 6/2017 | Christopher et al. | |
| 9,730,534 | B2 | | 8/2017 | Pierson | |
| 9,756,905 | B2 | | 9/2017 | Bielecki et al. | |
| 10,173,292 | B2 | | 1/2019 | Fullerton et al. | |
| 10,441,096 | B2 | | 10/2019 | Chung et al. | |
| 10,704,306 | B2 | * | 7/2020 | Schartner | E05C 17/56 |
| 11,168,499 | B2 | | 11/2021 | Pavlow | |
| 11,414,906 | B1 | | 8/2022 | Tallent | |
| 2004/0148734 | A1 | | 12/2004 | Chiu | |
| 2005/0050681 | A1 | | 3/2005 | Schlitter | |
| 2006/0006674 | A1 | * | 1/2006 | Kang | G06F 1/1679 292/251.5 |
| 2006/0125247 | A1 | | 6/2006 | Furia | |
| 2006/0236502 | A1 | | 10/2006 | Chiang | |
| 2007/0000775 | A1 | | 1/2007 | Nakahara et al. | |
| 2007/0007775 | A1 | | 1/2007 | Gallas et al. | |
| 2007/0163077 | A1 | | 7/2007 | Yang et al. | |
| 2008/0087053 | A1 | | 4/2008 | Frazier et al. | |
| 2009/0027149 | A1 | | 1/2009 | Kocijan | |
| 2009/0250949 | A1 | | 10/2009 | Sharpe | |
| 2009/0273194 | A1 | | 11/2009 | Patterson | |
| 2010/0162523 | A1 | | 7/2010 | Ferguson | |
| 2010/0236167 | A1 | | 9/2010 | Parker | |
| 2011/0018659 | A1 | | 9/2011 | Fullerton et al. | |
| 2012/0066873 | A1 | | 8/2012 | Lauder et al. | |
| 2013/0255033 | A1 | | 10/2013 | Vu | |
| 2014/0225385 | A1 | | 8/2014 | Millsap | |
| 2016/0244981 | A1 | | 8/2016 | Klein | |
| 2017/0086328 | A1 | | 3/2017 | Ly et al. | |
| 2018/0128025 | A1 | | 5/2018 | Estrada | |
| 2020/0318423 | A1 | | 10/2020 | Napier et al. | |
| 2020/0340507 | A1 | | 10/2020 | Kehdy | |
| 2021/0134501 | A1 | | 5/2021 | de la Rosa | |

FOREIGN PATENT DOCUMENTS

| | | | | | |
|---|---|---|---|---|---|
| CN | 101994444 | A | | 9/2014 | |
| CN | 206874098 | U | | 1/2018 | |
| CN | 108118989 | A | | 6/2018 | |
| CN | 107165515 | A | | 6/2019 | |
| CN | 209568834 | U | | 11/2019 | |
| CN | 209799664 | U | | 12/2019 | |
| CN | 111520012 | A | | 8/2020 | |
| CN | 111677392 | A | | 9/2020 | |
| CN | 112610089 | A | | 4/2021 | |
| CN | 215369287 | U | | 12/2021 | |
| CN | 111577039 | B | | 1/2022 | |
| DE | 2455520 | A1 | * | 5/1976 | |
| DE | 3041572 | A | * | 6/1982 | E05C 19/16 |
| DE | 3107195 | A1 | | 9/1982 | |
| DE | 29918117 | U1 | | 12/1999 | |
| DE | 202005016584 | U1 | * | 2/2006 | E05C 19/16 |
| DE | 202009014676 | | | 3/2010 | |
| DE | 202019001846 | U1 | | 7/2020 | |
| DE | 102009049005 | A1 | | 7/2021 | |
| DE | 102020115423 | A1 | | 12/2021 | |
| EP | 0490663 | B1 | | 8/1996 | |
| EP | 1959087 | A1 | | 8/2008 | |
| EP | 2620571 | A2 | | 7/2013 | |
| FR | 1179194 | A | * | 5/1951 | |
| GB | 2348923 | B | | 10/2002 | |
| GB | 2452146 | A | | 2/2009 | |
| JP | s58105524 | B | | 6/1986 | |
| JP | h10159425 | A | | 6/1998 | |
| JP | 2002271052 | A | | 9/2002 | |
| JP | 2008019645 | B | | 9/2011 | |
| KR | 20090110604 | A | | 10/2009 | |
| KR | 101663982 | B1 | | 10/2016 | |
| KR | 101984263 | B1 | | 5/2019 | |
| WO | 9406319 | A1 | | 3/1994 | |
| WO | 03060269 | A1 | | 7/2003 | |
| WO | 2006094491 | A1 | | 9/2006 | |
| WO | WO-2013057344 | A1 | * | 4/2013 | E05C 19/16 |
| WO | 2018191809 | A1 | | 10/2018 | |
| WO | 2019239276 | A1 | | 12/2019 | |

OTHER PUBLICATIONS

U.S. Appl. No. 18/456,600, filed Aug. 28, 2023, Rodney Napier.

U.S. Appl. No. 18/458,182, filed Aug. 30, 2023, Rodney Napier.

Epacenet machine translation WO2006094491A1 Sep. 14, 2006 description and claims (Year: 2023).

Espacenet machine translation JP2002271052A Sep. 20, 2002 description and claims (Year:2023).

* cited by examiner (section A-A)

(section B-B)

MAGNETIC DOOR CLOSURE

FIELD

The present disclosure relates to magnetic door closures. More particularly, this disclosure relates to an apparatus that includes a magnet in a door frame and multiple magnets in a door, configured so that one of the magnets in the door is attracted to the magnet in the door frame and one of the magnets in the door is repelled by the magnet in the door frame.

BACKGROUND

Conventional magnetic door closure technology uses devices that are bulky, aesthetically unpleasing, and noisy in operation, such as the ball and catch magnetic door closure. Many current devices require a plethora of magnets and professional installation. Current devices require unnecessary force to operate the door which causes damage to the magnet, door, and door frame over time.

For example, in the conventional magnetic ball and catch system, a component in a door frame securely catches a magnetic ball in the door. The system requires sufficient force to be applied to overcome the magnetic force of attraction between the door and door frame, which is more force than would be necessary to open the door in the absence of the system. As a result, excessive force must be applied by the user to open the door, resulting in additional noise and potential damage because the excessive force applied could damage the relatively soft material of the door.

What is needed therefore is a secure magnetic door closure system that operates without excessiveness noise or complicated installation and requires no more than an appropriately minimal amount of force to operate.

SUMMARY

The above and other needs are met by a magnetic door closure system having a magnet embedded in the door frame and two magnets embedded in a corresponding location at the top of the door, wherein the door magnets are of opposite polarity. One of the magnets at the top of the door is attracted to the magnet in the door frame, and the other magnet at the top of the door is repelled from the magnet in the door frame. The attracting magnet has a predetermined magnetic strength that provides the needed pull for complete closure. The repelling magnet has a lesser magnetic strength, thereby allowing the attracting magnet to complete the closure while softening the impact.

Embodiments described herein are directed to a magnetic door closure apparatus for use in conjunction with a door that is movable between an open position and a closed position within a door frame. In one embodiment, the magnetic door closure apparatus includes a first magnet, a second magnet and a third magnet. The first magnet is disposed in a first location in the door frame and has a first magnetic polarity. The second magnet is disposed in a second location in the door that corresponds to the first location in the door frame when the door is in the closed position. The second magnet has a second magnetic polarity that is the same as the first magnetic polarity. The third magnet is disposed in a third location in the door that corresponds to the first location in the door frame when the door is in the closed position. The third magnet has a third magnetic polarity that is opposite the first magnetic polarity. As the door approaches the closed position, the distance between the first location in the door frame and the second location in the door is less than the distance between the first location in the door frame and the third location in the door. In the preferred embodiment, there is a force of magnetic attraction between the first magnet and the third magnet, and a force of magnetic repulsion between the first magnet and the second magnet. The force of magnetic attraction is large enough to overcome the force of magnetic repulsion so as to allow the door to move from the open position to the closed position, and large enough to hold the door securely in the closed position. The force of magnetic repulsion is large enough to prevent the door from slamming against the door frame as the door moves from the open position to the closed position.

In some embodiments, the first magnet is embedded in a lower surface of a top portion of the door frame and the second and third magnets are embedded in an upper surface of the door that faces the lower surface of the top portion of the door frame when the door is in the closed position.

In some embodiments, the first magnet is in a leaf of a door hinge attached to the door frame, and the second and third magnets are in an opposing leaf of the door hinge attached to the door.

In some embodiments, the first, second and third magnets are embedded in polyurethane encasements.

In some embodiments, the polyurethane encasements of the first magnet and the third magnet have complementary male and female mating surfaces that nest into each other when the door is in the closed position.

In some embodiments, the magnetic door closure apparatus includes a magnet proximity adjustment apparatus that provides for adjusting a first spacing, which is the distance between the first magnet and the second magnet when the door is in the closed position. In some embodiments, the magnetic door closure apparatus includes a magnet proximity adjustment apparatus that provides for adjustment of a second spacing, which is the distance between the first magnet and the third magnet when the door is in the closed position In some embodiments, the magnet proximity adjustment apparatus includes a housing having a proximal end and a distal end, with a central aperture at its proximal end and a central bushing at its distal. Also within the housing is an externally threaded worm gear shaft having a proximal end extending into the aperture and a distal end rotatably seated in the bushing. At the proximal end of the worm gear shaft is a screw head that is operable to receive a tool for rotating the worm gear shaft. An internally threaded disk is rotatably threaded onto the worm gear shaft. The internally threaded disk is operable to move up or down within the housing by rotation of the worm gear shaft. In some embodiments, the internally threaded disk comprises the second magnet, or the second magnet is attached to the internally threaded disk. In some embodiments, the internally threaded disk comprises the third magnet, or the third magnet is attached to the internally threaded disk.

In some embodiments, the housing of the magnet proximity adjustment apparatus is formed from a nonferrous material.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1A:
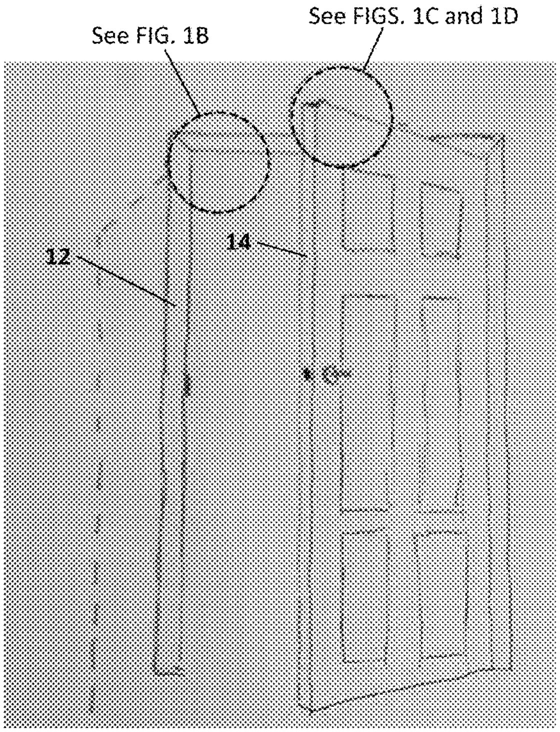
FIGS. 1A, 1B, 1C, 1D, and 1E depict a magnetic door closure apparatus according to an embodiment of the invention.
Figure 1C:
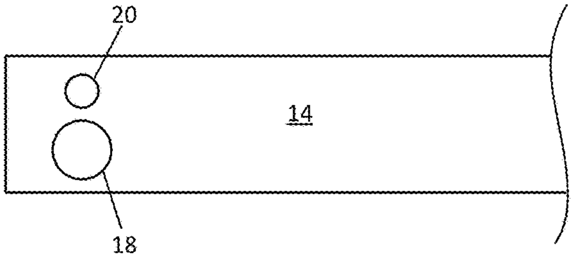
Figure 1D:
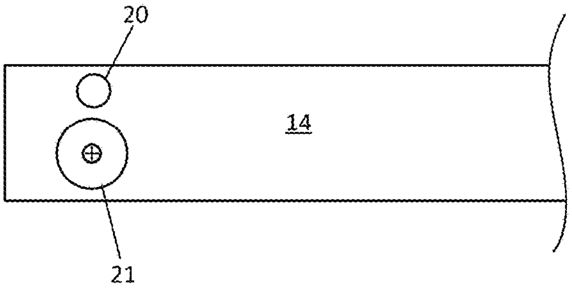
Figure 1B:
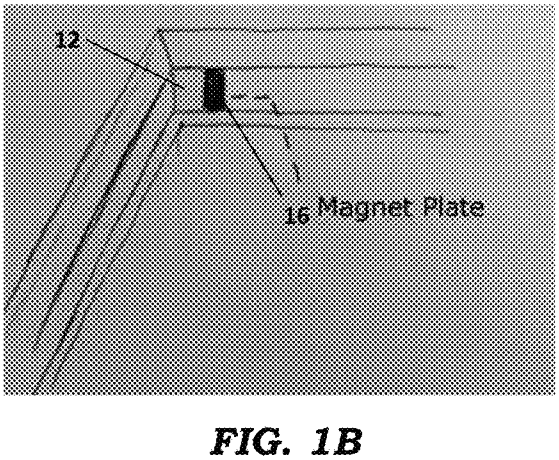

As shown in FIGS. 1A-1D, a preferred embodiment of a magnetic door closure apparatus is used in conjunction with a door frame 12 and a door 14. The system includes a magnet plate 16 embedded in the door frame 12. Although the magnet plate 16 is shown in FIG. 1B is embedded in the top of the door frame 12, the magnet 16 plate could be disposed near the middle or near the bottom of the door frame 12, or in some other location on the door frame 12.

In preferred embodiments, the magnetic door closure system includes an attracting magnet 18 and an opposing magnet 20 embedded in the door 14. The attracting magnet 18 is configured to have a magnetic polarity that is opposite the polarity of the magnet plate 16. The opposing magnet 20 is configured to have a magnetic polarity the same as that of the magnet plate 16. As the term is used herein, magnetic polarity refers to the north and south poles of magnets. An example of two magnets having opposite polarities would be the north pole of one magnet that is attracted to the south pole of another magnet. Examples of two magnets having the same polarities would be the north pole of one magnet being repelled by the north pole of another magnet, and the south pole of one magnet being repelled by the south pole of another magnet.

The attracting magnet 18 and opposing magnet 20 are installed in the door 12 at a position corresponding to the location of the magnet plate 16 on the door frame 12. Accordingly, in the preferred embodiment, the attracting magnet 18 and the opposing magnet 20 are at the top of the door 14 as shown in FIG. 1C. In alternative embodiments, the attracting magnet 18 and the opposing magnet 20 are located near the middle of the door 14, near the bottom of the door 14, or in some other location on the door 14.

In preferred embodiments, the magnet plate 16 and the attracting magnet 18 have a force of magnetic attraction that at least equals a force required to close the door 14 and hold the door 14 securely in the door frame 12.

In preferred embodiments, the magnet plate 16 and the opposing magnet 20 have a force of magnetic repulsion that is less than the force of magnetic attraction between the magnet plate 16 and the attracting magnet 18. However, the force of magnetic repulsion between the magnet plate 16 and the opposing magnet 20 is large enough to soften the closure of the door by preventing the door 14 from slamming against the frame 12. Based on this arrangement of magnets, the door closure system described herein generally requires less force to open a closed door than do conventional mechanical systems, and it also provides a secure connection between the door and the door frame when closed.

Figure 1E:
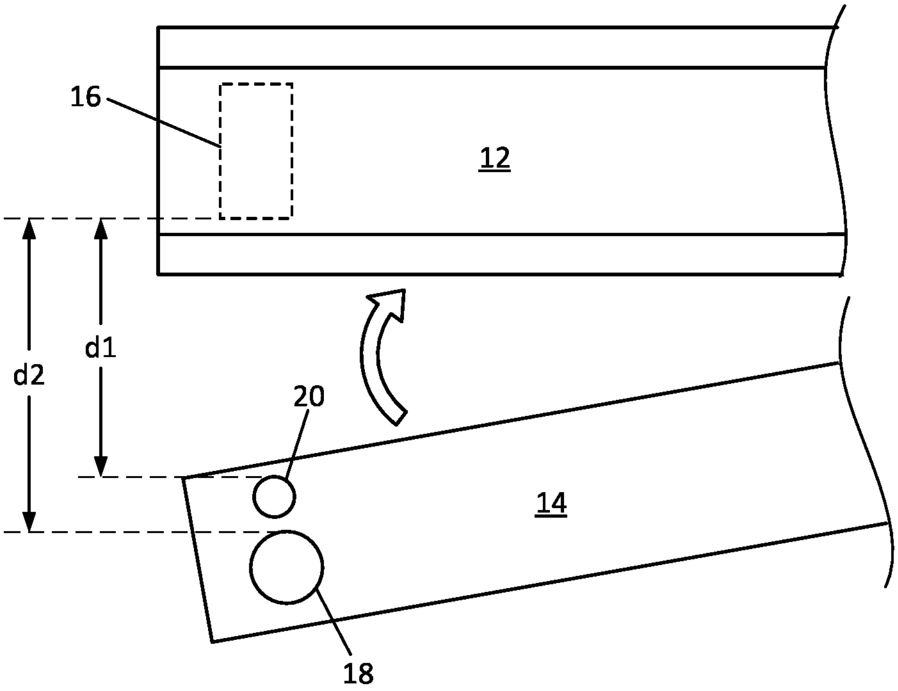
Figure 2A:
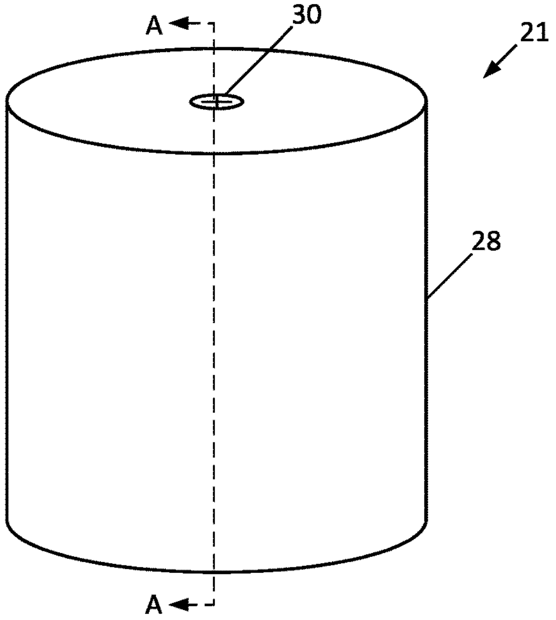
FIGS. 2A, 2B, 2C, and 2D depict a magnet proximity adjustment apparatus according to an embodiment of the invention.
Figure 2B:
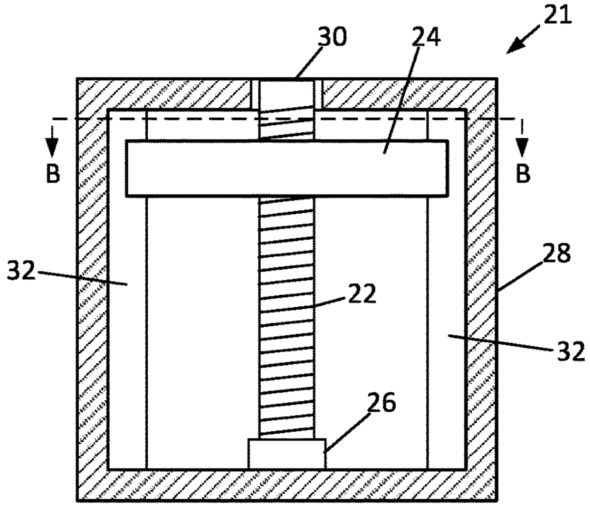
Figure 2C:
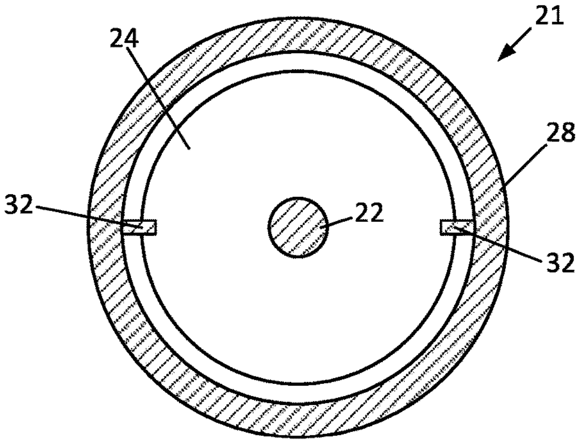
Figure 2D:
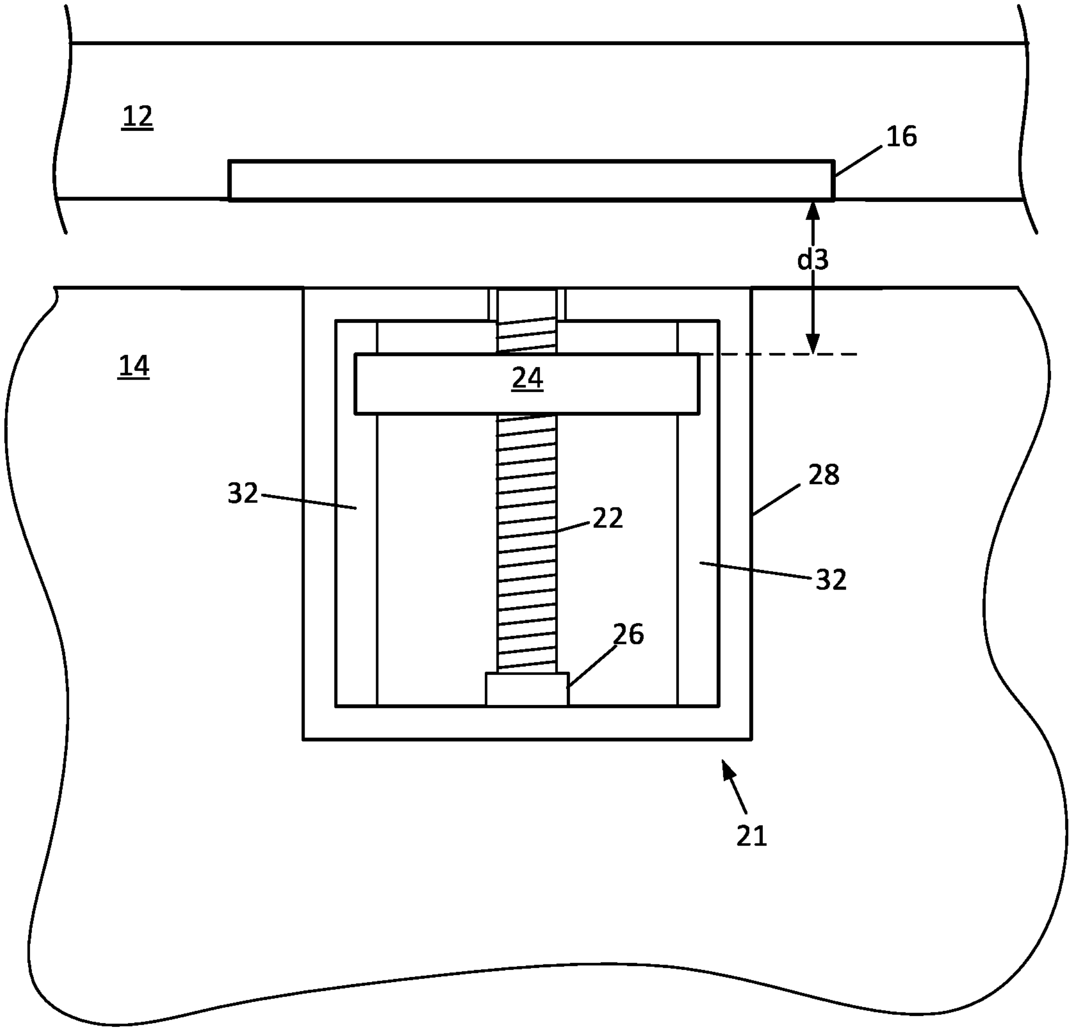

FIG. 1E depicts the top of the door 14 as it approaches the door frame 12, moving in the direction of the arrow from an open position toward a closed position. As discussed above, the magnet plate 16 (also referred to herein as the first magnet) is disposed in the door frame 12. (The magnet plate 16 is shown in dashed lines in FIG. 1E based on its location in the bottom of the door frame 12.) The opposing magnet 20 (also referred to herein as the second magnet) and the attracting magnet 18 (also referred to herein as the third magnet) are both disposed in the top of the door 14. As shown in FIG. 1E, as the door 14 approaches the door frame 12, the distance d1 between the magnet plate 16 and the opposing magnet 20 is less than the distance d2 between the magnet plate 16 and the attracting magnet 18. In this embodiment, there is a force of magnetic attraction between the magnet plate 16 and the attracting magnet 18, and a force of magnetic repulsion between the magnet plate 16 and the opposing magnet 20. Based on proper sizing of the magnets 16, 18, and 20, the force of magnetic attraction is large enough to overcome the force of magnetic repulsion so as to allow the door 14 to move from the open position to the closed position, and large enough to hold the door 14 securely in the closed position. The force of magnetic repulsion is large enough to prevent the door 14 from slamming against the door frame 12 as the door 14 moves from the open position to the closed position.

In some alternative embodiments, the magnet plate 16 is embedded in the door 14, and the attracting magnet 18 and the opposing magnet 20 are embedded in the door frame 12 in a position corresponding to the position at which the magnet plate 16 is embedded in the door 14.

In some embodiments, the magnet plate 16 and the attracting magnet 18 are embedded in encasements of polyurethane or other relatively soft material. In these embodiments, when the door 14 closes, the encasements on the magnet plate 16 and the attracting magnet 18 contact each other. This eliminates direct contact between hard surfaces, which results in a tight and quiet closure.

In some embodiments, the encasements of the magnet plate 16 and the attracting magnet 18 may have complementary male and female shapes that nest into each other upon closure, which assures maximum alignment and strength. Alternatively, the magnets themselves have complementary male and female shapes.

In some embodiments, the magnetic door closure system includes a mechanical structure that allows adjustment of the spacing between the magnet plate 16 and the attracting magnet 18 and/or the opposing magnet 20 when the door is closed. By thus controlling the spacing, the level of the force of magnetic attraction/repulsion between the magnet plate 16 and the attracting magnet 18 and opposing magnet 20 can be controlled to match the pull force needed for maintaining closure. FIG. 1D depicts an example of a magnet proximity adjustment apparatus 21 disposed in the top of the door 14. In this embodiment, the attracting magnet 18 is a component of the magnet proximity adjustment apparatus 21. In alternative embodiment, the opposing magnet 20 is a component of a magnet proximity adjustment apparatus, instead of or in addition to a magnet proximity adjustment apparatus containing the attracting magnet 18.

In one embodiment depicted in FIGS. 2A-2D, the magnet proximity adjustment apparatus 21 for adjusting the spacing d3 comprises a housing 28 formed from a nonferrous material, such as thermoplastic. The housing 28 encloses an externally threaded worm gear shaft 22, the bottom end of which is rotatably seated in a bushing 26 on the bottom of the housing 28, and the top end of which has a screw head extending through the housing 28 that receives a tool for manually rotating the shaft 22. An internally threaded magnetic disc 24 is rotatably mounted on the shaft 22. The magnetic disk 24 is made to move up or down on the shaft 22 by rotating the shaft 22. In the embodiment depicted in FIGS. 2B, 2C and 2D, a pair of rails 32 extending from the inside surface of the housing 28 are received within corresponding notches on the outer edges of the magnetic disk 24 to prevent the disk 24 from rotating with the shaft 22.

In some alternative embodiments, the strength of the magnetic attraction/repulsion between the magnet plate 16 and the magnets 18 and 20 may be adjusted by a magnetic shunt, or by a combination of the magnet proximity adjustment apparatus 21 and a magnetic shunt.

In some embodiments, the magnet plate 16 is part of a leaf of a door hinge that attaches to the door frame 12, and the attracting magnet 18 and the opposing magnet 20 are part of an opposing hinge leaf attached to the door 14 in a corresponding location.

Although the embodiments of the closure system described herein are compatible with any type of door, they are most well-suited for a double door (e.g., French doors) arrangement, including those that use dummy knobs because there is no central point for a latch system, and including those having an astragal.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated.

The invention claimed is:

1. A magnetic door closure apparatus for use in conjunction with a door that is movable between an open position and a closed position within a door frame, the magnetic door closure apparatus comprising:

a first magnet disposed in the door frame, the first magnet having a first magnetic polarity;

a second magnet disposed at a location in the door that is aligned with the first magnet when the door is in the closed position, the second magnet having a second magnetic polarity that is the same as the first magnetic polarity;

a third magnet disposed at a location in the door that is aligned with the first magnet when the door is in the closed position, the third magnet having a third magnetic polarity that is opposite the first magnetic polarity; and a magnet proximity adjustment apparatus that provides for adjustment of a distance between the first magnet and the second magnet when the door is in the closed position, the magnet proximity adjustment apparatus comprising:

a housing having a proximal end and a distal end;

an aperture centrally disposed at the proximal end of the housing;

a bushing centrally disposed at the distal end of the housing;

an externally threaded worm gear shaft disposed within the housing, the worm gear shaft having a proximal end extending into the aperture and a distal end rotatably seated in the bushing;

a screw head disposed at the proximal end of the worm gear shaft, wherein the screw head is operable to receive a tool for rotating the worm gear shaft; and an internally threaded disk rotatably threaded onto the worm gear shaft, wherein the internally threaded disk is operable to move up or down within the housing by rotation of the worm gear shaft, the internally threaded disk having an outer edge with one or more notches therein; and one or more rails extending from an inside surface of the housing that are received within the one or more notches in the outer edge of the internally threaded disk to prevent the internally threaded disk from rotating with the worm gear shaft, wherein the second magnet is a component of the magnet proximity adjustment apparatus, and the internally threaded disk comprises the second magnet or the second magnet is attached to the internally threaded disk, wherein the distance between the first magnet and the second magnet is less than a distance between the first magnet and the third magnet as the door moves toward the door frame as the door approaches the closed position, wherein a force of magnetic attraction exists between the first magnet and the third magnet when the door is in the closed position, wherein a force of magnetic repulsion exists between the first magnet and the second magnet when the door is in the closed position, wherein the force of magnetic attraction between the first magnet and the third magnet is large enough to overcome the force of magnetic repulsion between the first magnet and the second magnet so as to allow the door to move from the open position to the closed position, and large enough to hold the door securely in the closed position, and wherein the force of magnetic repulsion between the first magnet and the second magnet is large enough to prevent the door from slamming against the door frame as the door moves from the open position to the closed position.

2. The magnetic door closure apparatus of claim 1 wherein the first magnet is embedded in a lower surface of a top portion of the door frame and the second and third magnets are embedded in an upper surface of the door that faces the lower surface of the top portion of the door frame when the door is in the closed position.

3. The magnetic door closure apparatus of claim 1 wherein the first, second and third magnets are embedded in polyurethane encasements.

4. The magnetic door closure apparatus of claim 1 wherein the housing of the magnet proximity adjustment apparatus is formed from a nonferrous material.

5. The magnetic door closure apparatus of claim 1 wherein the force of magnetic repulsion between the first magnet and the second magnet is less than the force of magnetic attraction between the first magnet and the third magnet when the door is in the closed position.

6. A magnetic door closure apparatus for use in conjunction with a door that is movable between an open position and a closed position within a door frame, the magnetic door closure apparatus comprising:

a first magnet disposed in the door frame, the first magnet having a first magnetic polarity;

a second magnet disposed at a location in the door that is aligned with the first magnet when the door is in the closed position, the second magnet having a second magnetic polarity that is the same as the first magnetic polarity;

a third magnet disposed at a location in the door that is aligned with the first magnet when the door is in the closed position, the third magnet having a third magnetic polarity that is opposite the first magnetic polarity; and a magnet proximity adjustment apparatus that provides for adjustment of a distance between the first magnet and the third magnet when the door is in the closed position, the magnet proximity adjustment apparatus comprising:

a housing having a proximal end and a distal end;

an aperture centrally disposed at the proximal end of the housing;

a bushing centrally disposed at the distal end of the housing;

an externally threaded worm gear shaft disposed within the housing, the worm gear shaft having a proximal end extending into the aperture and a distal end rotatably seated in the bushing;

a screw head disposed at the proximal end of the worm gear shaft, wherein the screw head is operable to receive a tool for rotating the worm gear shaft;

an internally threaded disk rotatably threaded onto the worm gear shaft, wherein the internally threaded disk is operable to move up or down within the housing by rotation of the worm gear shaft, the internally threaded disk having an outer edge with one or more notches therein; and one or more rails extending from an inside surface of the housing that are received within the one or more notches in the outer edge of the internally threaded disk to prevent the internally threaded disk from rotating with the worm gear shaft, wherein the third magnet is a component of the magnet proximity adjustment apparatus, and the internally threaded disk comprises the third magnet or the third magnet is attached to the internally threaded disk, wherein a distance between the first magnet and the second magnet is less than the distance between the first magnet and the third magnet as the door moves toward the door frame as the door approaches the closed position, wherein a force of magnetic attraction exists between the first magnet and the third magnet when the door is in the closed position, wherein a force of magnetic repulsion exists between the first magnet and the second magnet when the door is in the closed position, wherein the force of magnetic attraction between the first magnet and the third magnet is large enough to overcome the force of magnetic repulsion between the first magnet and the second magnet so as to allow the door to move from the open position to the closed position, and large enough to hold the door securely in the closed position, and wherein the force of magnetic repulsion between the first magnet and the second magnet is large enough to prevent the door from slamming against the door frame as the door moves from the open position to the closed position.

7. The magnetic door closure apparatus of claim 6 wherein the housing of the magnet proximity adjustment apparatus is formed from a nonferrous material.

* * * * *